(12) United States Patent
Ishikawa

(10) Patent No.: US 6,219,357 B1
(45) Date of Patent: Apr. 17, 2001

(54) CHANNEL MULTIPLEX DEMULTIPLEX METHOD AND CHANNEL MULTIPLEX DEMULTIPLEX UNIT

(75) Inventor: Hajime Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/764,482

(22) Filed: Dec. 12, 1996

(30) Foreign Application Priority Data

Dec. 15, 1995 (JP) ................................................ 7-347706

(51) Int. Cl.[7] ........................................................ H04J 3/04
(52) U.S. Cl. ................................................ 370/535; 370/540
(58) Field of Search .................................... 370/535, 536, 370/537, 538, 539, 540, 541, 542, 514, 441, 522, 527; 375/292; 348/387

(56) References Cited

U.S. PATENT DOCUMENTS

| 4,750,138 | * | 6/1988 | Schouhamer | 364/514 |
| 5,008,878 | * | 4/1991 | Ahmadi et al. | 370/353 |
| 5,231,492 | * | 7/1993 | Dangi et al. | 358/143 |
| 5,270,714 | * | 12/1993 | Tanaka et al. | 341/59 |
| 5,400,023 | * | 3/1995 | Ino et al. | 341/59 |
| 5,483,534 | * | 1/1996 | Ohki | 370/84 |

FOREIGN PATENT DOCUMENTS 1-218233    8/1989  (JP) .

* cited by examiner

*Primary Examiner*—Chau Nguyen
*Assistant Examiner*—Alexander Boakye
(74) *Attorney, Agent, or Firm*—Scully, Scott, Murphy & Presser (57) ABSTRACT

At a transmission side, an encoder 4 codes data of each channel and inserts a special character attributing to each channel. A character multiplex circuit 5a byte multiplex each channel for outputting. At a reception side, a character synchronization circuit 9 synchronized with a character by detecting the special character. A character demultiplex circuit 10a demultiplexes a signal by a character byte and obtains data of each channel. A channel identification circuit 11 identifies each channel by detecting the special character attributing to the channel without bit rotating for synchronization. A decoder 14 executes decoding without bit rotating and outputs a signal from a channel demultiplex circuit.

17 Claims, 9 Drawing Sheets

FIG.6
CODED CHANNEL DATA TIMING CHART

FIG.7
CODED CHANNEL DATA TIMING CHART

FIG.8
CODED CHANNEL DATA TIMING CHART

FIG.9
PRIOR ART

CHANNEL MULTIPLEX DEMULTIPLEX METHOD AND CHANNEL MULTIPLEX DEMULTIPLEX UNIT

BACKGROUND OF THE INVENTION

This invention relates to an art of channel multiplex transmission by which a plurality of channels are multiplexed and transmitted, and particularly, to an art of channel multiplex demultiplex in a system for selecting particular data that have been received after multiplexing and transmission of a plurality of data.

Figure 9:
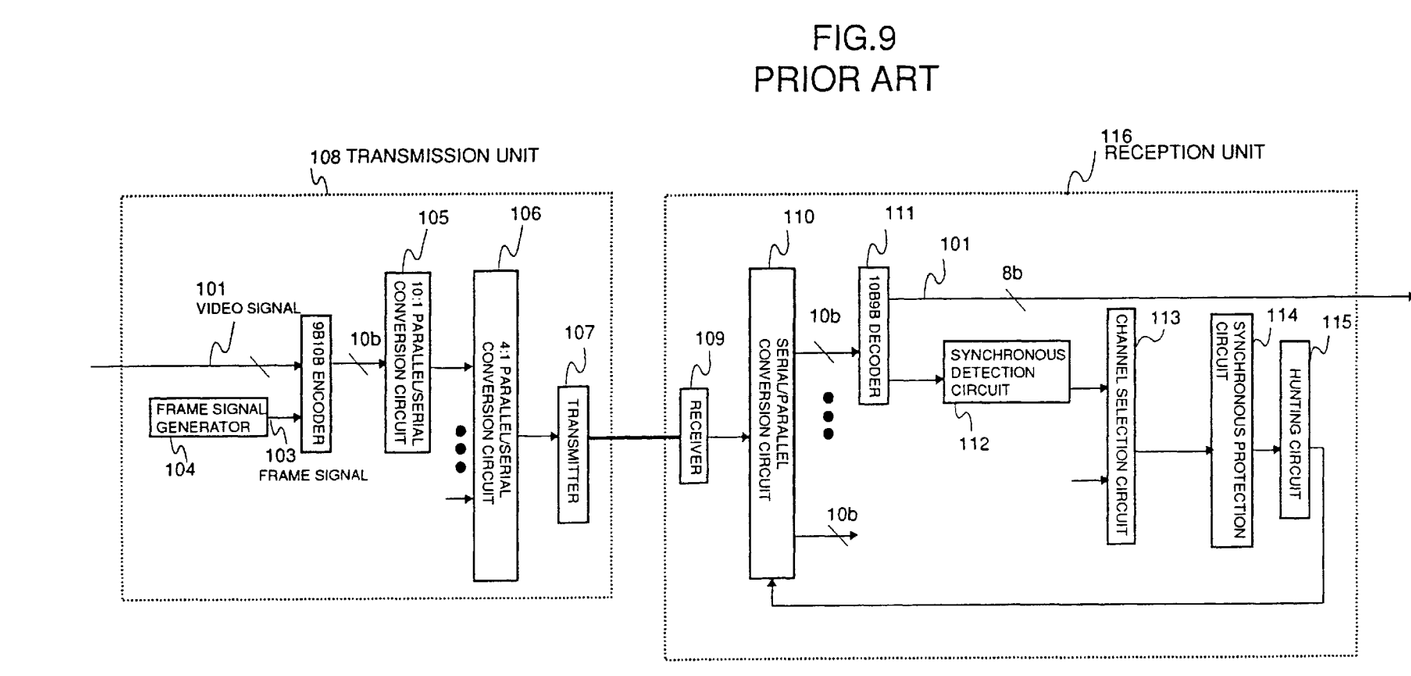
FIG. 9 is a block diagram of a conventional channel demultiplex unit.

Publication of JP-A-218233/1989 has disclosed a construction shown in FIG. 9 as a conventional channel multiplex demultiplex unit of the above-described type. It is assumed that 4 channels are multiplexed. Referring to FIG. 9, a transmission unit 108 at a transmission side combines an 8 bit parallel video signal 101 and a 1 bit serial frame signal 103 at each bit parallel into one channel signal. Then the resultant 9 bit parallel signal is converted into 10 bit parallel signal by a 9B10B coding circuit 102.

A frame signal generator 104 for generating a frame signal 103 is provided for each channel. The frame signal 103 has a common frame pattern containing a data signal.

The frame signal 103 is used for synchronization as well as for identification of each channel.

The 10 bit parallel signal of a channel output from the 9B10B encoder 102 is converted into a serial signal by 10:1 parallel/serial conversion circuit 105. The converted serial signal is further multiplexed among channels by 4:1 parallel/serial conversion circuit 106 and then input to a transmitter 107 from which the resultant transmission signal is sent to a transmission path. In a reception unit 11b, a receiver 109 receives the transmission signal, which is shifted to a serial/parallel conversion circuit 110 by a clock signal output from a hunting circuit 115. The 10 bit parallel signal corresponding to each channel is sequentially input to 10B9B decoder 111 corresponding to the channel.

A 9 bit parallel signal output from the 10B9B decoder 111 is separated into an 8 bit parallel video signal and a 1 bit frame signal. The frame signal of each channel is input to a corresponding synchronous detection circuit 112 and subjected to frame detection. The synchronous detection circuit 112 compares, for example, an input bit sequence (9 bit) with a predetermined synchronous pattern. When those patterns accord with each other, a synchronous detection signal is output. When the synchronous pattern is not detected, a report of detecting no synchronous pattern is sent to a synchronous protection circuit 114.

Among signals output from each synchronous detection circuit 112, those signals selected by a channel selection circuit 113 are input to the synchronous protection circuit 114 for frame synchronization.

When the frame synchronization is not executed in the synchronous protection circuit 114, the hunting circuit 115 shifts a phase of the clock driving the serial/parallel conversion circuit 110 by a predetermined amount. This operation is continued until the 10 bit parallel signal output from the serial/parallel conversion circuit 110 corresponds to each channel.

As aforementioned, in the conventional transmission system through channel multiplexing, 1 bit frame signal is added accompanied with a byte parallel signal of the data. The resultant coded byte becomes irregular, thus requiring its own coding.

As the decoded frame signal is serial, the frame signal is parallel converted and bit rotated (shifting the bit location in a cyclic manner, for example, inserted from LSB (low-order bit) overflowing from the MSB (high-order bit) side by the synchronous detection circuit at a reception side for comparing the bit pattern. The processing until detection of synchronization takes much time as well as requiring double bit rotate function (10B9B decoding and frame signal extraction in pattern detection for synchronous detection).

SUMMARY OF THE INVENTION

It is an object of the present invention to solve the aforementioned problems.

It is another object of the present invention to provide a channel multiplex demultiplex method allowing for channel selection with a simple circuit construction using a coding method in order to realize a stable circuit operation in a channel multiplex demultiplex unit for multiplexing and transmitting a channel.

The above object of the present invention is achieved by a channel multiplex demultiplex method for multiplexing and demultiplexing a plurality of channels comprising steps of: coding each channel using a coding method coding m bits to n bits (each m, n is predetermined integer but m<n) and setting n bits as 1 byte, inserting into each channel at least one bits string of n bit that has not been used for coding said m bits to said n bits as a channel identification byte for channel identification into each channel and multiplexing a plurality of channels; and identifying each channel from data in which a plurality of channels are multiplexed based on said channel identification byte.

The object of the present invention is achieved by a channel multiplex demultiplex method for multiplexing and demultiplexing a plurality of channels comprising steps of: coding each channel using a coding method coding m bits to n bits (each m, n is predetermined integer but m<n) and setting n bits as 1 byte; inserting at least one bits string of n bits that has not been used for coding said m bits to said n bits as a channel identification byte for identifying each channel into each channel; multiplexing channels to which said channel identification byte is inserted; and identifying each channel from data in which a plurality of channels are multiplexed based on said channel identification byte.

The object of the present invention is achieved by a channel multiplex demultiplex method for multiplexing and demultiplexing a plurality of channels comprising steps of: inserting identification data into each channel for channel identification; multiplexing a plurality of channels to which said identification data are inserted; coding data in which a plurality of channels are multiplexed using a coding method coding m bits to n bits (each m, n is predetermined integer but m<n) and setting n bits as 1 byte and converting said identification data into 1 byte channel identification byte containing bits strings of n bits that has not been used for coding said m bits to said n bits; and identifying each channel from data in which a plurality of channels are multiplexed based on said channel identification byte.

The object of the present invention is further achieved by a channel multiplex demultiplex unit for multiplexing and demultiplexing a plurality of channels comprising: a multiplex circuit for coding each channel using a coding method coding m bits to n bits (each m, n is predetermined integer but m<n) and setting n bits as 1 byte, inserting at least one bits string of n bits that has not been used for coding said m bits to said n bits as a channel identification byte for channel identification and byte synchronization into each channel and multiplexing a plurality of channels; and a demultiplex circuit for identifying each channel from data in which a plurality of channels are multiplexed based on said channel identification byte and demultiplexing each channel.

The characteristic of the present invention is coding data of a channel using a coding method for coding m bits to n bits (each m, n is predetermined integer but m<n) setting the n bits as 1 byte. The n bits string that has not been used for coding the m bits to n bits is used as an identification byte for identifying the channel and as characters for byte synchronization.

Assuming that 1 bits is coded to 2 bits, the 1 bits takes the bits string either 0 or 1. The 2 bits takes the bits string 00, 01, 10 or 11. For example, when coding the 1 bits string "0" to the 2 bits string "00" and coding the 1 bits string "1" to the 2 bits string "01", those 2 bit strings "10" and "11" cannot be used for coding. Therefore those 2 bits strings "10" and "11" can be used as identification bytes for channel identification and as characters for byte synchronization. The term "byte" used herein refers to a set of certain bit string.

BRIEF DESCRIPTION OF THE DRAWINGS

This and other objects, features and adbantages of the present invention will become more apparent upon a reading of the following detailed description and drawings, in which.

BRIEF DESCRIPTION OF THE EMBODIMENTS

Figure 6:
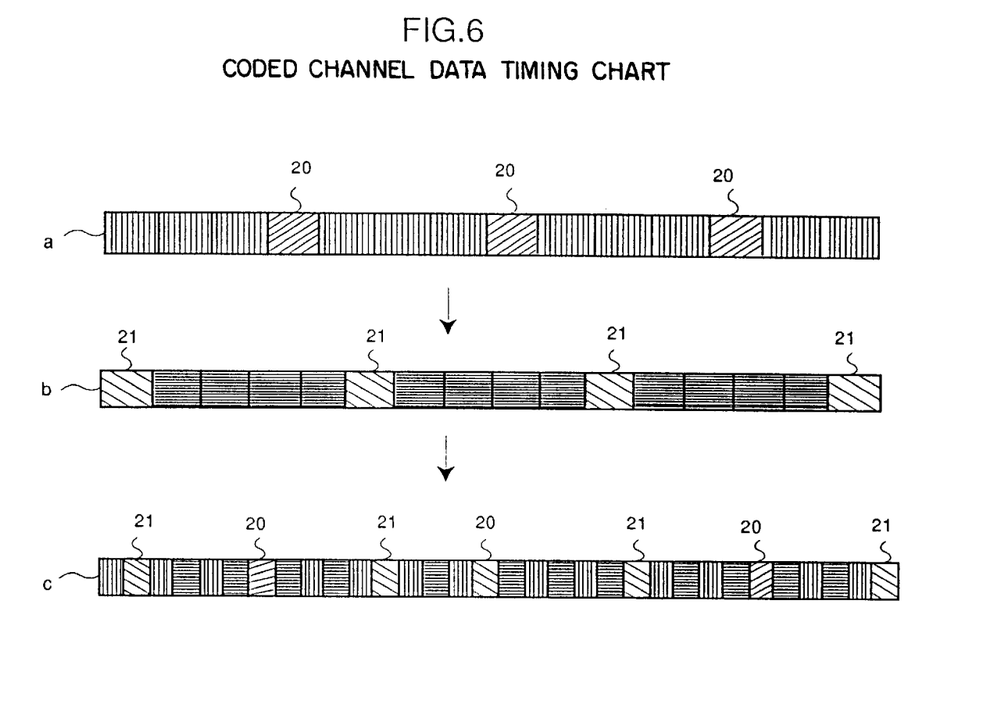
FIG. 6 is an explanatory view representing a channel multiplex demultiplex method of the present invention.

The principle of a channel multiplex demultiplex method of the present invention is explained referring to a timing chart of FIG. 6. It is assumed that 2 channels are multiplexed herein.

First coded channel data a and second coded channel data b are output at every byte, setting an effective character n bit for coding as 1 byte. A channel identification byte (hereinafter referred to as a special character) is inserted into this effective character string for synchronization and identification when executing character synchronization at a reception side. As the inserted special character, a first special character 20 is assigned to the first coded channel data a. A second special character 21 that is different from the first special character 20 is assigned to the second coded channel data b.

Two coded channel data are byte multiplexed at every character byte (n bit) into character multiplexed data c.

The reception side receives the character multiplexed data c and detects either one or both bit patterns of the above two special characters through bit rotation or other operation for character synchronization.

In case each of the coded channel data a, b and special characters 20 and 21 corresponding to the respective channels are inserted at a cyclic interval, character synchronization is protected. In case of no cyclic insertion, each byte phase of n kinds of characters is monitored for character synchronization at a phase where the bit pattern of the special character has been detected.

The first and second channel data a and b can be obtained through demultiplex at each byte by synchronizing with character and identifying the character byte (n bit).

The special characters inserted to the channel data a and b are synchronized with character, which can be easily detected for channel identification.

The channel data are byte multiplexed, setting m bit as 1 byte to form byte multiplex data f.

Each byte of the byte multiplex data f is independent at every channel. Even when the byte multiplexed data f are coded at every m bit 1 byte, independence of the character byte (n bit) at every channel is assured.

As a result, data g derived from coding the byte multiplexed data f become almost the same as the character multiplexed data as c shown in FIG. 6.

The reception side receives the coded data g and synchronizes with character by detecting either one or both of the first special character 20 or/and the second special character 21 through bit rotation and decoding at each character, thus providing byte multiplexed data f.

In case that each of special characters is inserted into the respective channel data in a cyclic manner, character synchronization is protected.

In case of no cyclic insertion, each byte phase of n types is monitored and character synchronization is executed at a phase where the bit pattern of the special character has been detected.

As the byte multiplexed data f are multiplexed by, setting m bit as 1 byte, the byte multiplexed data f is demultiplexed at every byte provides a first m bit It is well known that a time slot a byte each channel on the character multiplexed data c for character synchronization by detecting either one or both of two special characters. So the reception side is allowed to demultiplex each byte for two channels after identifying each of two channels at every character byte.

In the present invention using N (integer equal to or more than 3) channels, it is necessary to detect at least (N−1) special characters. Alternatively it is required to identify the order of multiplexing in advance at the transmission side so as to identify the time slot for all other channels from the time slot of the channel in which the special character has been detected.

Figure 7:
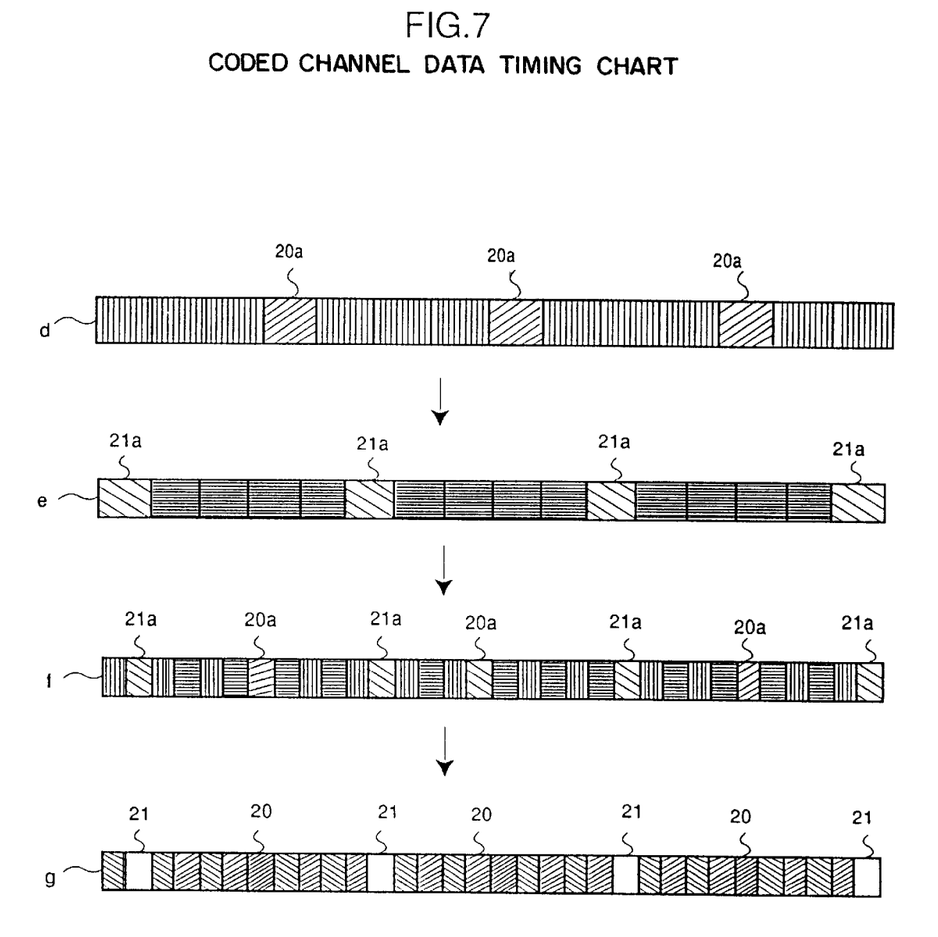
FIG. 7 is an explanatory view representing a channel multiplex demultiplex method of the present invention.

In FIG. 6, multiplexing is executed after coding each channel. However, the data can be formed into m bit parallel before coding each channel data. The m bit parallel data are byte multiplexed as 1 byte and then coded. FIG. 7 shows a timing chart of the above-described case. It is assumed that 2 channels are multiplexed.

A first special character 20a before coding and a second special character 21a before coding are inserted into a first m bit parallel channel data d and a second m bit parallel channel data e, respectively. parallel channel data d and second m bit parallel channel data e.

Each special character before coding that has been inserted to the respective channel data d and e can be easily detected because of synchronized byte, thus allowing for channel identification.

It is well known that a time slot has a byte of the character forming each channel on the coded data g since either one of two special characters is detected for character synchronization. It is, accordingly, well known that the time slot has a byte of the character forming each channel on the coded data g in order to execute character synchronization by detecting either one of two special characters. The reception side is allowed to demultiplex each channel after identifying each of two channels, respectively.

In the present invention using N (N is an integer equal to or more than 3), at least (N−1) special characters should be detected, Alternatively the order of multiplexing is identified in advance at the transmission side and the time slot for all other channels has to be identified from the time slot of the channel in which the special character has been detected.

Figure 8:
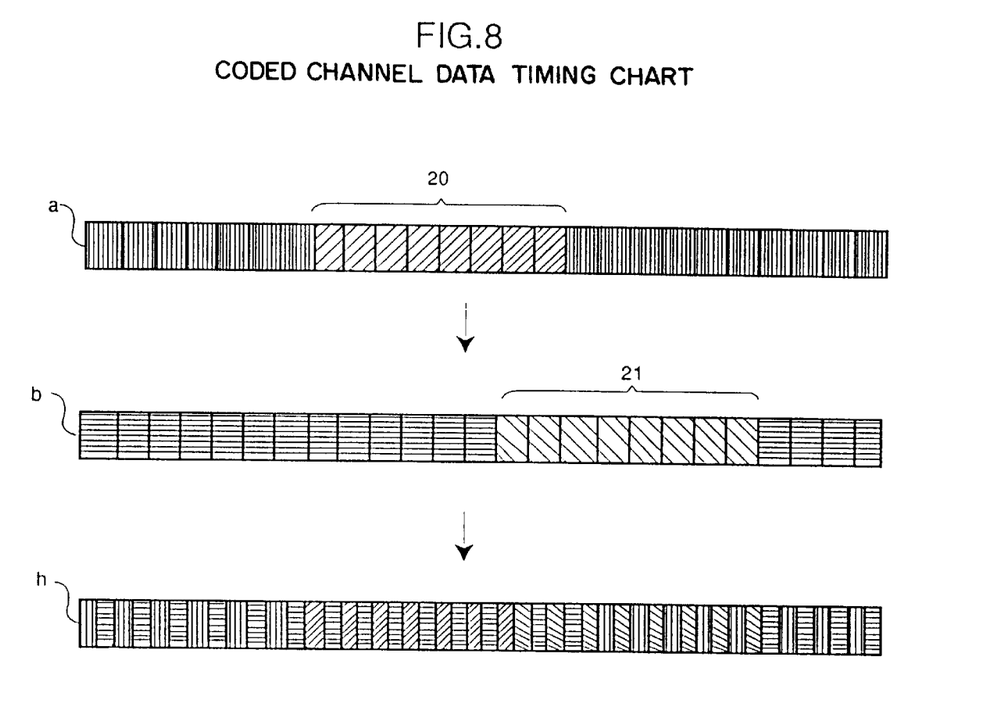
FIG. 8 is an explanatory view representing a channel multiplex demultiplex method of the present invention.

In FIG. 6 and FIG. 7, each channel is multiplexed at every character ultimately used in accordance with a coding method. However FIG. 8 shows another multiplexing method such as bit multiplexing in which multiplexing is not executed at each character. It is assumed that two channels are multiplexed.

The coded first channel data a and the coded second channel data b are multiplexed into bit multiplexed data h.

The reception side receives the bit multiplexed data h and obtains the coded first channel data a and coded second channel data b which have been demultiplexed at every channel.

The bit pattern of the special character (8 bit) inserted into each channel data is detected through bit rotation operation. Character synchronization is executed as well as identification of each channel based on the detected special character.

In this case, assuming that N channels are used, the special characters of at least (N−1) channels should be detected. Alternatively the order of multiplexing at the transmission side is obtained in advance and the channel is identified by detecting the special character inserted into the channel. Then the time slot for all other channels should be identified from the above time slot.

In the present invention, a special character can be assigned to each channel. However a plurality of characters can be combined in order to represent one channel.

For example, 4 special characters, A, B, C and D, are prepared and any two of those characters are combined to represent 6 channels, for example, (AB), (AC), (AD), (BC), (BD) and (CD).

Then a construction of the channel multiplex transmission unit is described.

Figure 1:
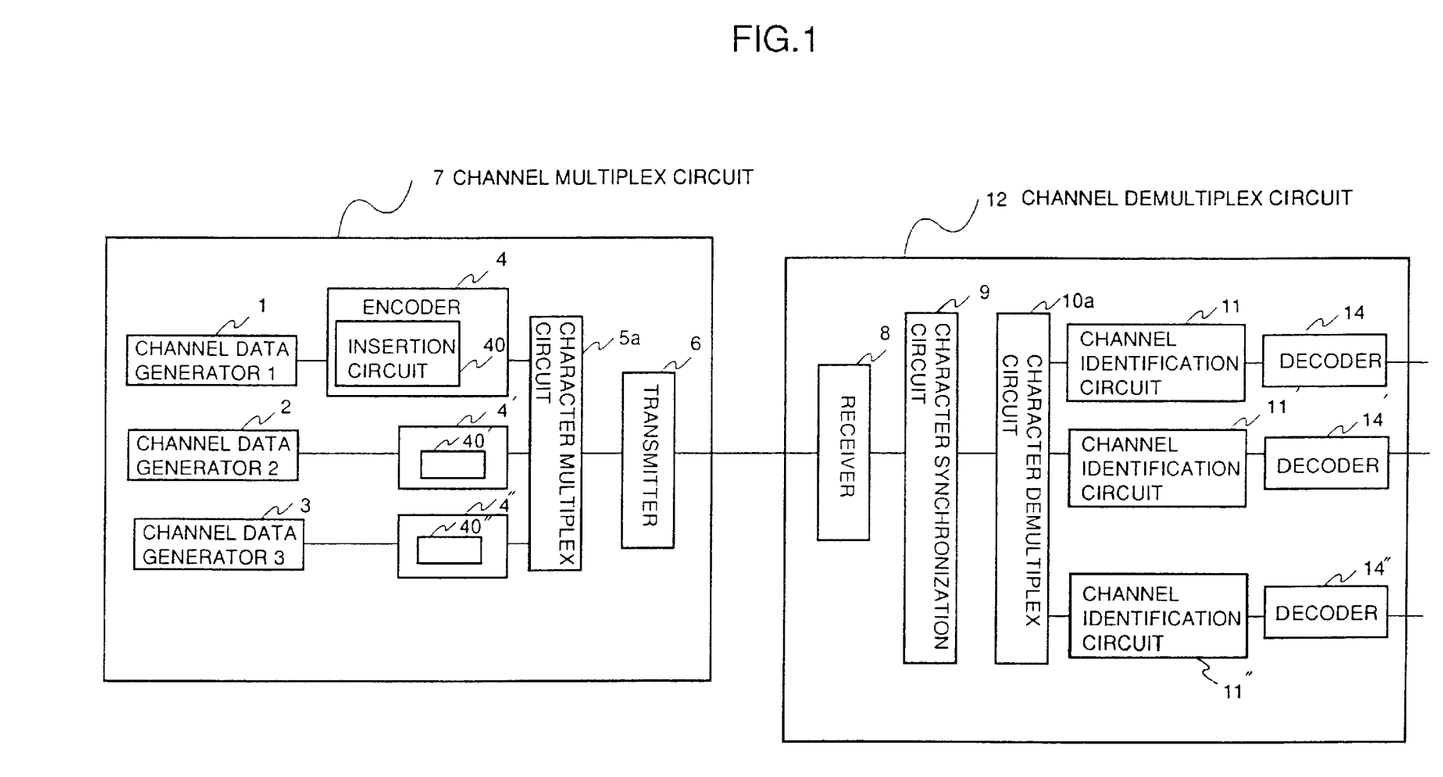
FIG. 1 is a block diagram of a channel multiplex transmission demultiplex unit of a first embodiment.

FIG. 1 is a block diagram of a construction of the channel multiplex transmission unit of a first embodiment of the present invention. In FIG. 1, 3 channels are multiplexed at the transmission side.

In a channel multiplex circuit 7 as a transmission side, channel data are output from the respective channel data generators 1 to 3, which are input to the corresponding encoders 4 to 4" for coding. At this point, each special character attributing to the respective channels is inserted by insertion circuits 40 to 40" like the coded first and the second channel data a and b as shown in FIG. 6. The channel data generators 1 to 3 can be provided outside the channel multiplex circuit 7.

Each output of the encoders 4 to 4" is composed of n bit parallel signal.

Each output of the encoders 4 to 4" is input to a character multiplex circuit 5a and time division multiplexed with a byte, setting n bit character as 1 byte for outputting. The above-obtained signal is then input to a reception side 6. The signal input to the reception side 6 is usually a serial signal.

An output of the character multiplex circuit 5a is transmitted to a transmission path by the transmitter 6. This is the construction of the channel multiplex circuit 7.

In a channel demultiplex circuit 12 at a reception side, a transmitted signal is received by a receiver 8 and then input to a character synchronization circuit 9 where character synchronization is executed by detecting a special character and a signal is output at every byte of the character. This output is recognized as an n bit parallel signal at every character.

The output signal of the character synchronization circuit 9 is input to a character demultiplex circuit 10a where the output signal is demultiplexed into three signals each for a byte of the character forming 3 channels for outputting.

Each of 3 output signals of the character demultiplex circuit 10a is input to the respective channel identification circuits 11 to 11" where channel identification is executed based on a bit pattern of the special character that has been inserted to the channel. Each of the output signals is then decoded by the respective decoders 14 to 14" where the respective channel data are output upon termination of the special character.

This is the explanation of the channel demultiplex circuit 12.

Next a second embodiment is described.

Figure 2:
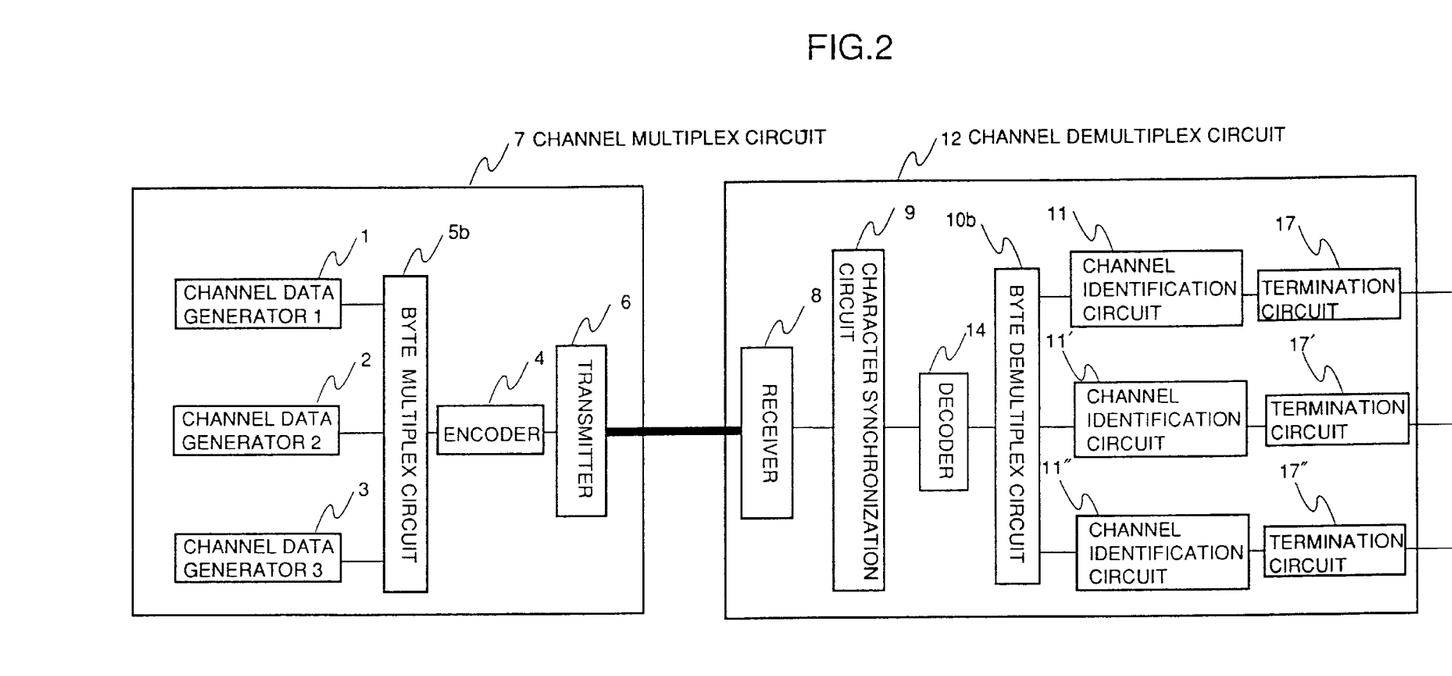
FIG. 2 is a block diagram of a channel multiplex transmission demultiplex unit of a second embodiment.

FIG. 2 is a block diagram of the second embodiment of the present invention. It is assumed that 3 channels are multiplexed at a transmission side.

In a channel multiplex circuit 7 at the transmission side, each output of a first to a third channel data generators 1 to 3 is input to a byte multiplex circuit 5b for m bit parallelizing the respective channel data. The obtained data as 1 byte are time division byte multiplexed. The number of the bit "m" of the parallel signal is equal to the number of the bit for forming 1 byte before coding according to the coding method in use.

The time division byte multiplexed signal is input to an encoder 4. As coded data g of FIG. 7 shows, the respective special character attributing to each time division byte multiplexed signal is inserted thereto.

The channel data generators 1 to 3 can be provided outside the channel multiplex circuit 7. An output of the encoder 4 is input to a transmitter 6 for transmitting the output signal to a transmission path. The output of the encoder 4 is preferably a serial signal. This is the explanation of the channel multiplex circuit 7.

In a channel demultiplex circuit 12 at a reception side, a transmitted signal is received by a receiver 8. An output signal of the receiver 8 is input to a character synchronization circuit 9 where character synchronization is executed by detecting a special character. An output signal of the character synchronization circuit 9 is normally recognized as an n bit parallel signal at every byte of a character.

The n bit parallel signal is input to a decoder 14 for decoding and outputting the decoded m bit parallel signal.

As the decoder 14 requires to output a flag indicating decoding of the special character at a time slot of decoding the special character, 1 bit is output for the flag accompanied with the output of m bit parallel signal.

As the output of m bit parallel signal is obtained by byte multiplexing each channel, setting m bit as 1 byte, each channel data can be obtained by byte demultiplexing the m bit parallel signal. An output signal of the decoder 14 is input to a byte demultiplex circuit 10b where the output signal is demultiplexed at a time slot of the m bit parallel signal. At the same time, the output for the flag is also demultiplexed at the respective time slots.

Each of the demultiplexed m bit parallel output is input to the respective channel identification circuits 11 to 11" where channel identification is executed. At this time, each channel is identified based on a bit pattern of the m bit parallel signal at a time slot accorded with the timing for the flag indicating decoding of the special character.

As each of the m bit parallel signal at this time slot contains no data, it is subjected to channel identification in the respective channel identification circuits 11 to 11" and then termination in the respective termination circuits 17 to 17". The m bit parallel signal other than those at the above time slot passes through the termination circuits 17 to 17", which is output from the channel demultiplex circuit 12. This is the explanation on the construction of the channel demultiplex circuit 12.

Compared with the first embodiment, as the encoder 4 in the channel multiplex circuit 7 and the decoder 14 in the channel demultiplex circuit 12 of the second embodiment can be commonly used by the respective channels, the circuit size can be reduced. This is effective particularly for multiplexing many channels.

Additionally as the second embodiment codes multiplexed data for each channel, the signal for transmission is allowed to preserve the coding rule in use.

Referring to FIGS. 1 and 2, the channel multiplex circuit 7 is compatible with the channel demultiplex circuit 12. Therefore the combination of the channel multiplex circuit 7 of FIG. 1 and the channel demultiplex circuit 12 of FIG. 2 or the channel multiplex circuit 7 of FIG. 2 and the channel demultiplex circuit 12 of FIG. 1 can be used.

Figure 3:
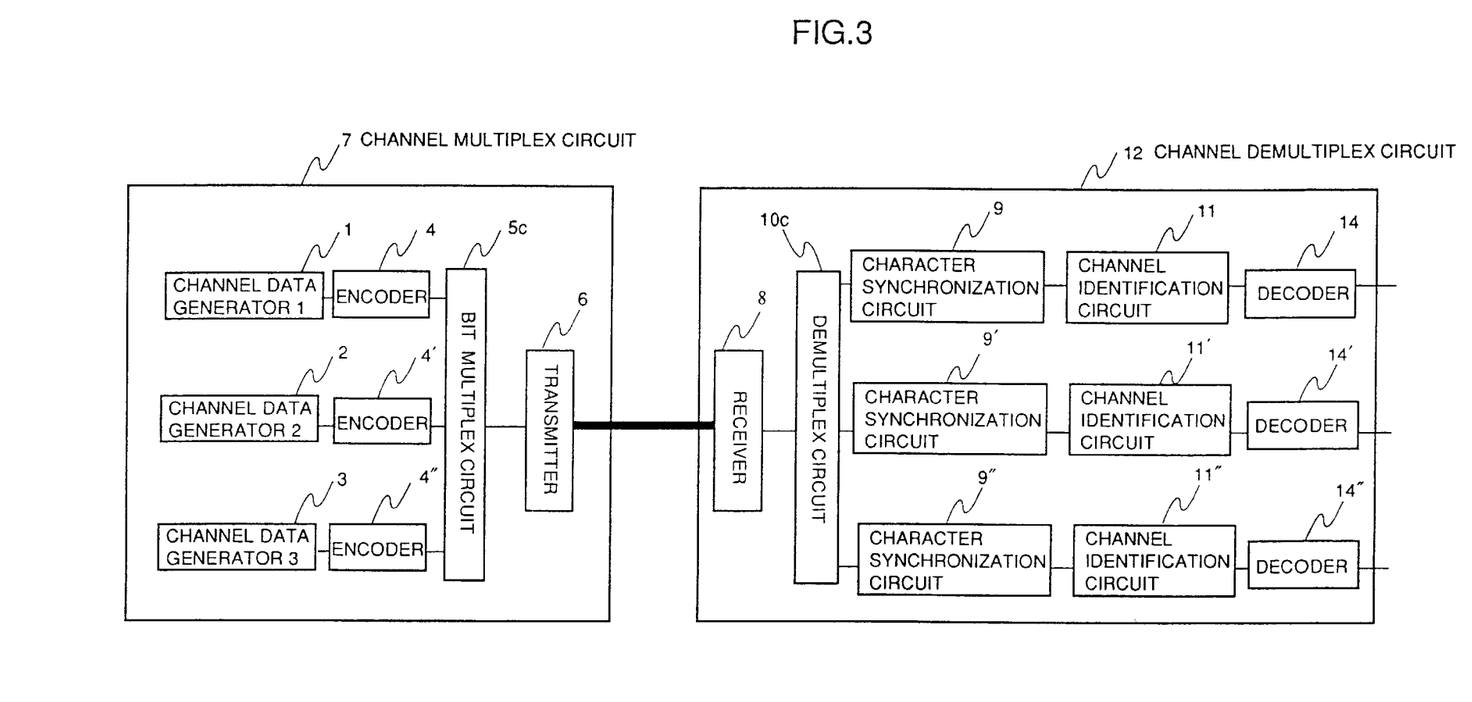
FIG. 3 is a block diagram of a channel multiplex transmission demultiplex unit of a third embodiment.

A third embodiment is described. A construction of the third embodiment of the present invention is shown by a block diagram. In FIG. 3, it is assumed that 3 channels are multiplexed at the transmission side.

In a channel multiplex circuit 7 at the transmission side, each output of channel data generators 1 to 3 is input to the respective encoders 4 to 4" for coding. Additionally the special character is inserted as shown by coded first and the second channel data a and b of FIG. 8.

Each output of the encoder 4 to 4" is input to a bit multiplex circuit 5c for time division bit multiplexing with no character synchronization and outputting a signal to a transmission path through a transmitter 6.

The channel data generators 1 to 3 can be provided outside the channel multiplex circuit 7. This is the explanation of the channel multiplex circuit 7.

In a channel demultiplex circuit 12 at a reception side, a receiver 8 receives a signal sent through the transmission path and outputs a signal to a demultiplex circuit 10c for demultiplexing the output signal in a manner corresponding to the multiplex process used in the bit multiplex circuit 5c.

Each of the signal demultiplexed to the respective channels is input to the respective character synchronization circuits 9 to 9" where character synchronization is executed by detecting the special character. Each of the resultant signals is further input to channel identification circuits 11 to 11" and subjected to channel identification based on the bit pattern of the special character detected by the channel identification circuits 11 to 11". Each of the output signals is further decoded by the respective decoders 14 to 14" where the special character is terminated. This is the explanation on the construction of the channel demultiplex circuit 12.

A fourth embodiment is described.

Figure 4:
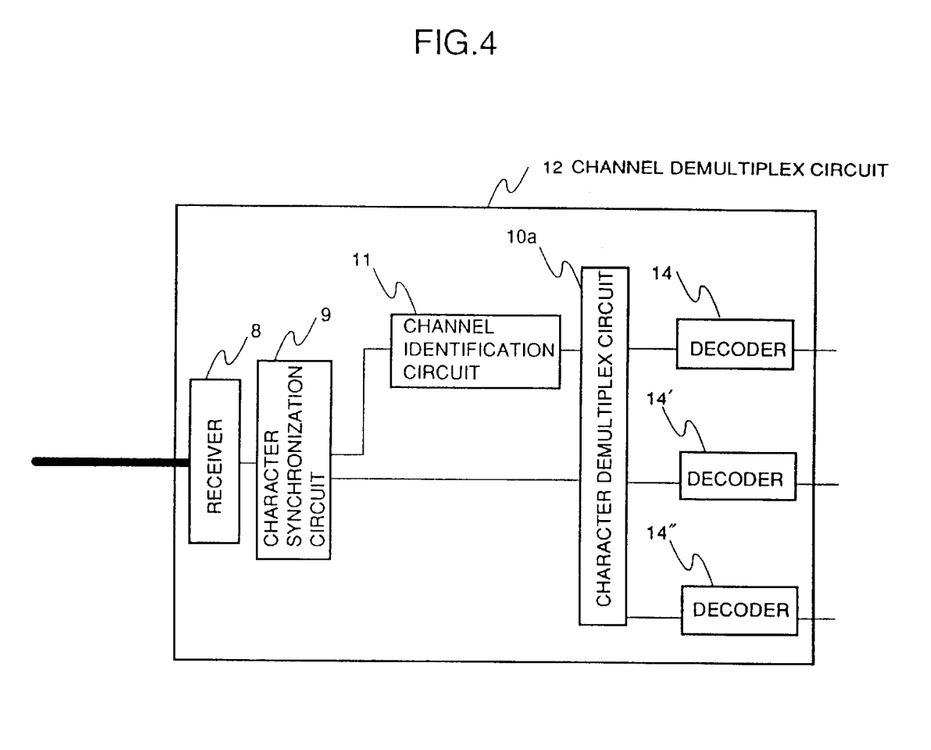
FIG. 4 is a block diagram of a channel demultiplex unit of a fourth embodiment.

FIG. 4 shows a construction of the fourth embodiment of the present invention. FIG. 4 is a block diagram representing the construction of a channel demultiplex circuit of a channel multiplex demultiplex unit according to the present embodiment. It is assumed that 3 channels are multiplexed at the transmission side. The construction of the channel multiplex circuit 7 at the transmission side is the same as that shown in FIG. 1 or FIG. 2.

Referring to FIG. 4, in a channel demultiplex circuit 12 of the present embodiment, a receiver 8 receives a signal, which is input to a character synchronization circuit 9. The character synchronization circuit 9 synchronizes with a character by detecting a special character as well as detects the special character of at least (n−1) channels (n is the total number of channels; n=3 in the drawings) so that information on the character detected at a time slot forming each channel is supplied to a channel identification circuit 11.

The channel identification circuit 11 identifies each channel based on information on the special character supplied from the character synchronization circuit 9 and inputs information on time slot where the character byte forming each channel locates to a character demultiplex circuit 10a.

The character demultiplex circuit 10a demultiplexes each channel at every time slot and outputting signal indicating the channel of the demultiplexed signal respectively. One time slot consists of one character.

Each output signal of the character demultiplex circuit 10a is decoded by the respective decoders 14 to 14".

When the order of multiplexing the channels in the channel multiplex circuit 7 has been already known to the channel demultiplex circuit 12, the channel identification circuit 11 identifies the channel contained in the time slot detected by the character synchronization circuit 9 based on the special character contained in the above-described time slot. As a result, the channels contained in all the time slots can be identified sequentially in the order of multiplexing.

A fifth embodiment is described.

Figure 5:
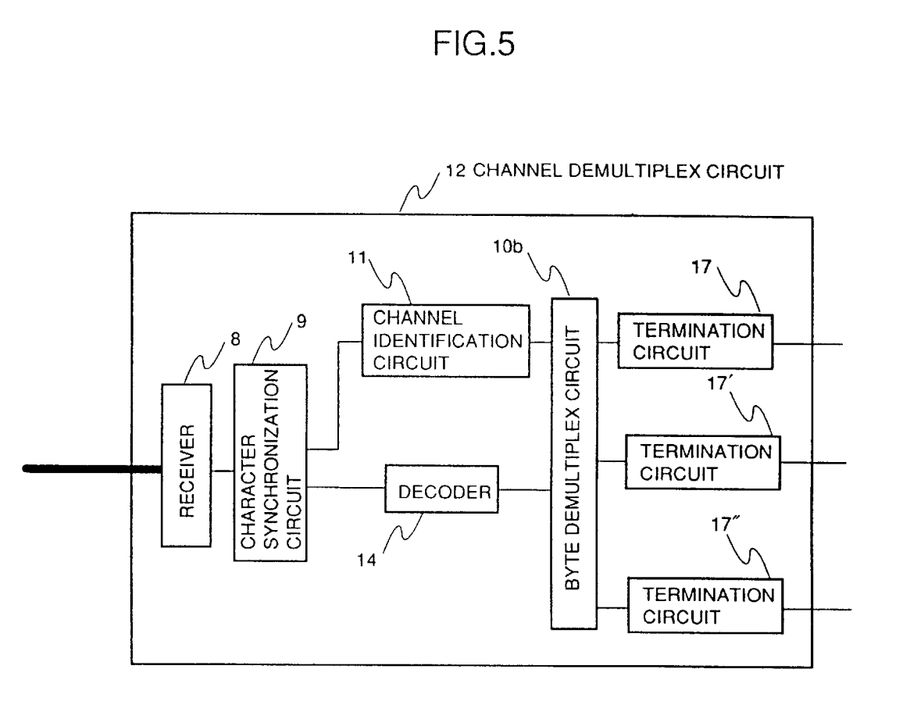
FIG. 5 is a block diagram of a channel demultiplex unit of a fifth embodiment.

FIG. 5 is a block diagram representing a channel demultiplex circuit of a channel multiplex demultiplex unit of the fifth embodiment of the present invention. It is assumed that 3 channels are multiplexed at the transmission side. The construction of the channel multiplex circuit 7 at the transmission side is the same as that shown either in FIG. 1 or FIG. 2.

Referring to FIG. 5, in the channel demultiplex circuit 12 of the present embodiment, a receiver 8 receives a signal, which is subjected to character synchronization in a character synchronization circuit 9 by detecting the special character. The synchronization circuit 9 detects special characters of at least (n−1) channels (n is the total number of channels; n=3). The information on the special characters detected for each time slot forming each channel is input to a channel identification circuit 11.

The channel identification circuit 11 identifies each channel based on the information of the special character supplied from the character synchronization circuit 9 and inputs information on the time slot where the character byte forming each channel locates.

An output of the character synchronization circuit 9 is normally formed as an n bit parallel signal, setting n bit at every character as 1 byte. The n bit parallel signal is decoded by a decoder 14, which is input to a byte demultiplex circuit 10b as m bit parallel signal, setting the m bit as 1 byte.

When the delay in decoding is negligible, information on the time slot where the character byte forming each channel supplied from the channel identification circuit 11 to the byte demultiplex circuit 10b becomes effective even for the m bit parallel signal after decoding.

The byte demultiplex circuit 10b determines that the byte of the m bit parallel signal at a timing accorded with the time slot information where the character byte forming each channel output from the channel identification circuit 11 is regarded as the byte forming each channel, and then outputs each signal at each channel separately.

An output of the byte demultiplex circuit 10b is input to termination circuits 17 to 17" accompanied with the respective flag outputs, which is output from the channel demultiplex circuit 12 by terminating the time slot data after decoding the special character.

When the order of channel multiplexing in the channel multiplex circuit 7 has been already known to the channel demultiplex circuit 12, the channel contained in the time slot detected by the character synchronization circuit 9 can be identified by the channel identification circuit 11 based on the special character contained in the above time slot. Although the present embodiment assumes that 3 channels are multiplexed, 4 or more channels can be multiplexed in the present invention.

In the channel multiplex demultiplex unit of the present invention, coding is executed in order to reduce low frequency component of the multiplex signal. Channel synchronization is executed by changing the special character by each channel when decoding at the reception side and channel identification is executed simultaneously. Compared to a conventional receiver which executes channel identification by executing frame synchronization apart from the character synchronization, the present invention requires only one stage of bit rotate circuit accompanied with the synchronization. Therefore the circuit size within the reception demultiplex unit can be decreased to 60% of the conventional one, resulting in compact and low power consumption unit.

What is claimed is:

1. A channel multiplex demultiplex method for multiplexing and demultiplexing a plurality of channels comprising the steps of:
    coding each channel using a coding method coding m bits to n bits (each m, n is a predetermined integer but m<n) and setting n bits as 1 byte, inserting into each channel a plurality of bit strings of n bits that has not been used for coding said m bits to said n bits which are combined into one channel identification byte for channel identification, synchronizing and multiplexing a plurality of channels; and
    identifying each channel from data in which a plurality of channels are multiplexed based on said channel identification byte.

2. A channel multiplex demultiplex method for multiplexing and demultiplexing a plurality of channels comprising the steps of:
    coding each channel using a coding method coding m bits to n bits (each m, n is a predetermined integer but m<n) and setting n bits as 1 byte;
    inserting at least one bit string of n bits that has not been used for coding said m bits to said n bits into each channel as a channel identification byte for identifying and synchronizing each channel;
    byte multiplexing channels to which said channel identification byte is inserted; and
    identifying each channel from data in which a plurality of channels are multiplexed based on said channel identification byte.

3. A channel multiplex demultiplex method for multiplexing and demultiplexing a plurality of channels comprising the steps of:
    coding each channel using a coding method coding m bits to n bits (each m, n is a predetermined integer but m<n) and setting n bits as 1 byte;
    inserting at least one bit string of n bits that has not been used for coding said m bits to said n bits into each channel as a channel identification byte for identifying and synchronizing each channel;
    multiplexing channels to which said channel identification byte is inserted;
    identifying each channel from data in which a plurality of channels are multiplexed based on said channel identification byte; and
    wherein a plurality of bit strings of n bits that has not been used for coding said m bits to said n bits are combined into one channel identification byte.

4. A channel multiplex demultiplex method for multiplexing and demultiplexing a plurality of channels comprising steps of:
    inserting identification data into each channel for channel identification;
    synchronizing and byte multiplexing a plurality of channels to which said identification data are inserted;
    coding data in which a plurality of channels are multiplexed using a coding method coding m bits to n bits (each m, n is predetermined integer but m<n) and setting n bits as 1 byte and converting said identification data into 1 byte channel identification byte containing bit strings of n bits that has not been used for coding said m bits to said n bits; and
    identifying each channel from data in which a plurality of channels are multiplexed based on said channel identification byte.

5. A channel multiplex demultiplex unit for multiplexing and demultiplexing a plurality of channels comprising:
    a multiplex circuit for coding each channel using a coding method coding m bits to n bits, each m, n is predetermined integer but m<n, and setting n bits as 1 byte, inserting at least one bit string of n bits that has not been used for coding said m bits to said n bits as a channel identification byte for channel identification and byte synchronization into each channel and multiplexing a plurality of channels; and
    a demultiplex circuit for identifying each channel from data in which a plurality of channels are multiplexed based on said channel identification byte and demultiplexing each channel.

6. The channel multiplex demultiplex unit of claim 5, wherein said multiplex circuit comprising:
    coding means for coding data of each channel using a coding method coding m bits to n bits, m, n: a predetermined integer, m<n, and setting n bits as 1 byte;
    insertion means for inserting at least one bit string of n bits that has not been used for coding said m bits to said n bits as a channel identification byte into data of each channel coded by said coding means; and
    multiplex means for time division bit multiplexing data of each channel to which said channel identification byte is inserted.

7. The channel multiplex demultiplex unit of claim 6, wherein said demultiplex circuit comprising:

demultiplex means for demultiplexing an output signal of said multiplex circuit for each channel;

a plurality of synchronization means for synchronizing with a byte setting n bits as 1 byte by detecting said channel identification byte from said demultiplexed signal;

a plurality of channel identification means for identifying a channel of a signal output from said synchronization means based on said detected channel identification byte; and decoding means for decoding a signal from said demultiplex means.

8. The channel multiplex demultiplex unit of claim 5, wherein said multiplex circuit comprising:

coding means for coding data of each channel using a coding method coding m bits to n bits, each m, n is predetermined integer but m<n, and setting n bits as 1 byte;

insertion means for using a bits string of n bits that has not been used for coding said m bits to said n bits as a special character, inserting at least one said bits string of n bits as a channel identification byte into data of each channel that has been coded by said coding means and outputting an n bits parallel signal of each channel; and multiplex means for time division byte multiplexing said n bits parallel signals of a plurality of channels, setting said n bits parallel signal as 1 byte.

9. The channel multiplex demultiplex unit of claim 8, wherein said demultiplex circuit comprising:

synchronization means for synchronizing with a byte by detecting a channel identification byte from output signals of said multiplex circuit and outputting an n bits parallel signal as 1 byte from said output signals;

demultiplex means for demultiplexing said plurality of n bits parallel signals for each channel which has been time division byte multiplexed setting n bits as 1 byte;

a plurality of channel identification means for identifying a channel based on a channel identification byte that has been inserted into said demultiplexed channel; and a plurality of decoding means for decoding outputs of said demultiplex means.

10. The channel multiplex demultiplex unit of claim 8, wherein said demultiplex means comprising:

synchronization means for synchronizing with a byte by detecting a channel identification byte from output signals of said multiplex circuit and outputting an n bits parallel signal as 1 byte from said output signal;

decoding means for outputting a m bits parallel signal by decoding said n bits parallel signal;

demultiplex means for demultiplexing said plurality of m bits parallel signal for each channel that has been time division byte multiplexed setting m bits as 1 byte;

a plurality of channel identification means for decoding each output sent from said demultiplex means and identifying a channel based on a decoded special character; and a plurality of termination means for terminating said channel identification byte from an output of said demultiplex means.

11. The channel multiplex demultiplex unit of claim 8, wherein said demultiplex circuit comprising:

synchronization means for synchronizing with a byte by detecting a channel identification byte from output signals of said multiplex circuit and outputting n bits parallel signal as 1 byte from said output signal;

channel identification means for identifying a time slot of a byte of each channel based on said detected channel identification byte;

distribution means for distributing said n bits parallel signal for a corresponding channel based on said channel identification means; and a plurality of decoding means for decoding said distributed n bits parallel signal.

12. The channel multiplex demultiplex unit of claim 8, wherein said demultiplex circuit comprising:

synchronization means for synchronizing with a byte by detecting a channel identification byte from output signals of said multiplex circuit and outputting n bits parallel signal as 1 byte from said output signal;

channel identification means for identifying a time slot of a byte of each channel based on said detected channel identification byte;

decoding means for decoding said n bits parallel signal to m bits parallel signal;

distribution means for distributing said m bits parallel signal for a corresponding channel based on information on said channel identification means; and a plurality of termination means for terminating said channel identification byte from said distributed m bits parallel signal.

13. The channel multiplex demultiplex unit of claim 5, wherein said multiplex circuit comprising:

insertion means for inserting a preceding special character for channel identification into data of each channel;

multiplex means for time division byte multiplexing m bits parallel signal of data of each channel to which said precoding special character is inserted; and coding means for coding said multiplexed data using a coding method coding m bits to n bits each m, n is a predetermined integer but m<n and setting n bits as 1 byte and, at a time for coding, converting said preceding special character into a special character as channel identification byte formed of bit string of n bits that has not been used for coding said m bits to said n bits.

14. The channel multiplex demultiplex unit of claim 13, wherein said demultiplex circuit comprising:

synchronization means for synchronizing with a byte by detecting a channel identification byte from output signals of said multiplex circuit and outputting n bits parallel signal as 1 byte from said output signal;

demultiplex means for demultiplexing said plurality of n bits parallel signals for each channel that has been time division byte multiplexed setting n bits as 1 byte;

a plurality of channel identification means for identifying a channel based on a channel identification byte inserted to said demultiplexed channel; and a plurality of decoding means for decoding an output of said demultiplex means.

15. The channel multiplex demultiplex unit of claim 13, wherein said demultiplex circuit comprising:

synchronization means for synchronizing with a byte by detecting a channel identification byte from output signals of said multiplex circuit and outputting n bits parallel signal as 1 byte from said output signal;

decoding means for outputting m bits parallel signal by decoding said n bits parallel signal;

demultiplex means for demultiplexing said plurality of said n bits parallel signals for each channel that has been time division byte multiplexed setting said m bits as 1 byte;

a plurality of channel identification means for decoding each output of said demultiplex means and identifying a channel based on a decoded special character; and a plurality of termination means for terminating said channel identification byte from an output of said demultiplex means.

16. The channel multiplex demultiplex unit of claim 13, wherein said demultiplex circuit comprising:

synchronization means for synchronizing with a byte by detecting a channel identification byte from output signals of said multiplex circuit and outputting n bits parallel signal as 1 byte from said output signal;

channel identification means for identifying a time slot of a byte of each channel based on said detected channel identification byte;

distribution means for distributing said n bits parallel signal for a corresponding channel based on information on said channel identification means; and a plurality of decoding means for decoding said distributed n bits parallel signal.

17. The channel multiplex demultiplex unit of claim 13, wherein said demultiplex circuit comprising:

synchronization means for synchronizing with a byte by detecting a channel identification byte from output signals of said multiplex circuit and outputting n bits parallel signal as 1 byte from said output signal;

channel identification means for identifying a time slot of a byte of each channel based on said detected channel identification byte;

decoding means for decoding said n bits parallel signal to m bits parallel signal;

distribution means for distributing said m bits parallel signal for a corresponding channel based on information on said channel identification means; and a plurality of termination means for terminating said channel identification byte from said distributed m bits parallel signal.

* * * * *